(12) United States Patent
Hammerschmidt

(10) Patent No.: US 9,343,959 B2
(45) Date of Patent: May 17, 2016

(54) INTERRUPT PROTECTION CIRCUITS, SYSTEMS AND METHODS FOR SENSORS AND OTHER DEVICES

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 179 days.

(21) Appl. No.: 14/090,130

(22) Filed: Nov. 26, 2013

(65) Prior Publication Data

US 2015/0145499 A1     May 28, 2015

(51) Int. Cl.
*H02M 1/32*     (2007.01)
*H02M 3/07*     (2006.01)

(52) U.S. Cl.
CPC ................................. *H02M 3/07* (2013.01)

(58) Field of Classification Search
CPC ........... H02M 1/31; H02M 1/36; H02M 3/07; H02M 3/073; H02M 1/32; G05F 3/30; G05F 3/262
USPC ............ 363/49, 50, 59, 60; 323/312; 327/536
See application file for complete search history.

(56) References Cited

U.S. PATENT DOCUMENTS

| | | | |
|---|---|---|---|
| 6,828,851 B1 * | 12/2004 | Lee et al. | 327/537 |
| 7,576,445 B2 | 8/2009 | Hammerschmidt | |
| 2002/0101748 A1 * | 8/2002 | Loechner | 363/84 |
| 2002/0125872 A1 * | 9/2002 | Groom et al. | 323/288 |
| 2002/0196643 A1 * | 12/2002 | Appeltans | 363/60 |
| 2011/0018550 A1 * | 1/2011 | De Jong et al. | 324/537 |
| 2011/0274295 A1 * | 11/2011 | Motoki | 381/120 |

OTHER PUBLICATIONS

PS15 Steering Committee, PS15 Peripheral Sensor Interface for Automotive Applications, dated Oct. 8, 2012, V2.1, 62 pages.
PS15 Steering Committee, PS15 Peripheral Sensor Interface—Substandard Airbag, V2.1, Oct. 5, 2012, 15 pages.
Denso Corporation, Freescale Semiconductor Inc. and TRW Automotive Inc., DSI Bus Standard, Revision 1.00, dated Feb. 16, 2011, 45 pages.

* cited by examiner

*Primary Examiner* — Adolf Berhane
(74) *Attorney, Agent, or Firm* — Eschweiler & Associates, LLC

(57) ABSTRACT

Embodiments relate to circuits, systems and methods for providing interruption protection for sensors and other devices. One example embodiment includes an interruption protection circuit comprising at least one charge pump and at least one buffer capacitor configured to maintain and/or provide sufficient voltage for output signals of sensors or other devices during micro-breaks or other interruptions.

15 Claims, 3 Drawing Sheets

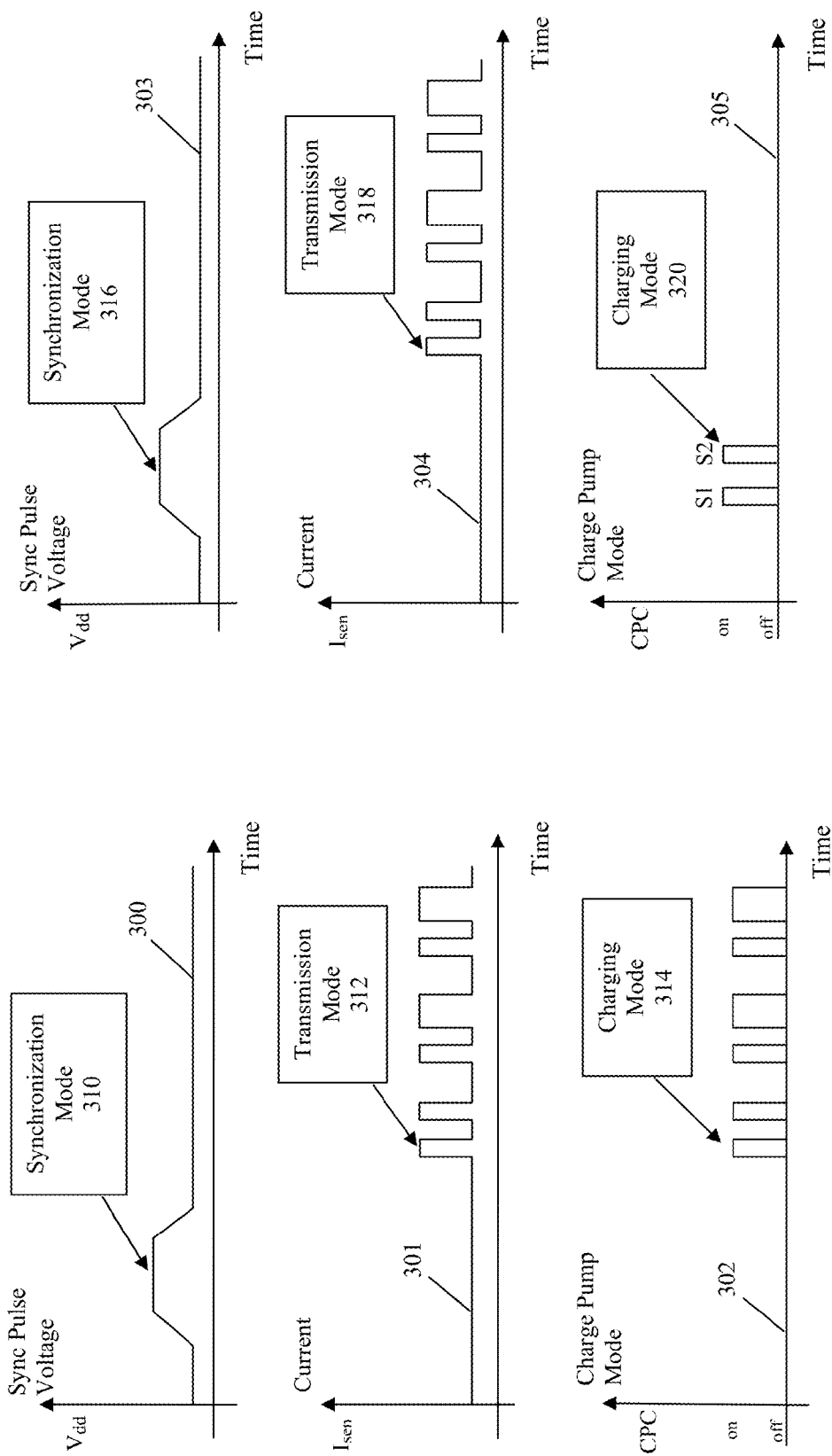

INTERRUPT PROTECTION CIRCUITS, SYSTEMS AND METHODS FOR SENSORS AND OTHER DEVICES

TECHNICAL FIELD

The invention relates generally to interrupt protection circuits, and more particularly to providing pumped micro-break protection to maintain a sufficient voltage of the output signal of sensors and other devices during micro-breaks and other interruptions.

BACKGROUND

Sensors can be used for monitoring and controlling in a variety of applications. Such applications may include use in automotive vehicle safety systems. Here, the sensors can be used to detect environmental changes such as collisions and trigger deployment of an airbag system in a vehicle. The triggering event initiates communication between the sensor and the electronic control unit of the vehicle. Thereby, voltage variations, such as short-term setbacks of the supply voltage, can occur in the sensor supply networks of vehicles and particularly in certain areas of the sensor supply network. For example, heavy jerky movements, such as shocks or vibrations of the vehicle, can cause short-term interruptions at one of the plug connections, so that short-term setbacks of the voltage supply of security-relevant systems, such as the airbag sensor, can also occur. These setbacks of the voltage supply are generally referred to as micro-breaks.

Micro-break protective circuitry generally utilizes one or more buffer capacitors as secondary voltage sources to maintain supply voltage in the event of momentary losses or interruptions. A conventional method used to maintain the supply voltage during the occurrence of a micro-break is to charge the buffer capacitors to the operating voltage by connecting the capacitor to the airbag sensor voltage supply. One drawback of this method is that a reduction in the operating voltage decreases the amount of charge available to the buffer capacitor, thereby inhibiting the ability of the capacitor to shunt the micro-break.

Another conventional approach for overcoming this drawback is to utilize synchronization pulses to provide an increased charging voltage to the buffer capacitor. With this method, short periodic pulses are applied to the input terminals of an airbag sensor to create an increased supply voltage at the input. As a result, this allows the buffer capacitor to store a greater charge and discharge a higher voltage than the operating voltage in the event of a micro-break. A drawback to this approach is that newer protocols which utilize synchronization pulses decrease the value of the supply voltage by applying negative synchronization pulses, which in turn fail to provide the necessary charging voltage to the buffer capacitor.

SUMMARY

Embodiments relate to interrupt protection circuits for providing pumped micro-break protection to maintain a sufficient voltage of the output signal of sensors and other devices during micro-breaks and other interruptions.

In an embodiment, an interruption protection system for a circuit comprises a power supply configured to provide power for the circuit; a capacitor configured to provide buffer energy; a charge pump electrically coupled to the capacitor to charge the capacitor to a buffer voltage; a reference unit configured to provide a reference signal; and a controller coupled to the power supply and to the reference unit and configured to receive the reference signal and to selectively control a supply path from the power supply and from the capacitor to power the circuit based on a comparison of the reference signal and a voltage level of the power supply.

In an embodiment, a method of providing buffer energy to a circuit comprises enabling a charge pump to charge at least one buffer capacitor; receiving a power supply signal characterizing an event of a circuit; evaluating the power supply signal; and selectively utilizing the at least one buffer capacitor to provide energy to the circuit based on the evaluating.

BRIEF DESCRIPTION OF THE DRAWINGS

The invention may be more completely understood in consideration of the following detailed description of various embodiments of the invention in connection with the accompanying drawings, in which:

FIG. 3A is a timing diagram of an output signal of the charge pump circuit, according to an embodiment.

FIG. 3B is a timing diagram of an output signal of the charge pump circuit, according to an embodiment.

Figure 1:
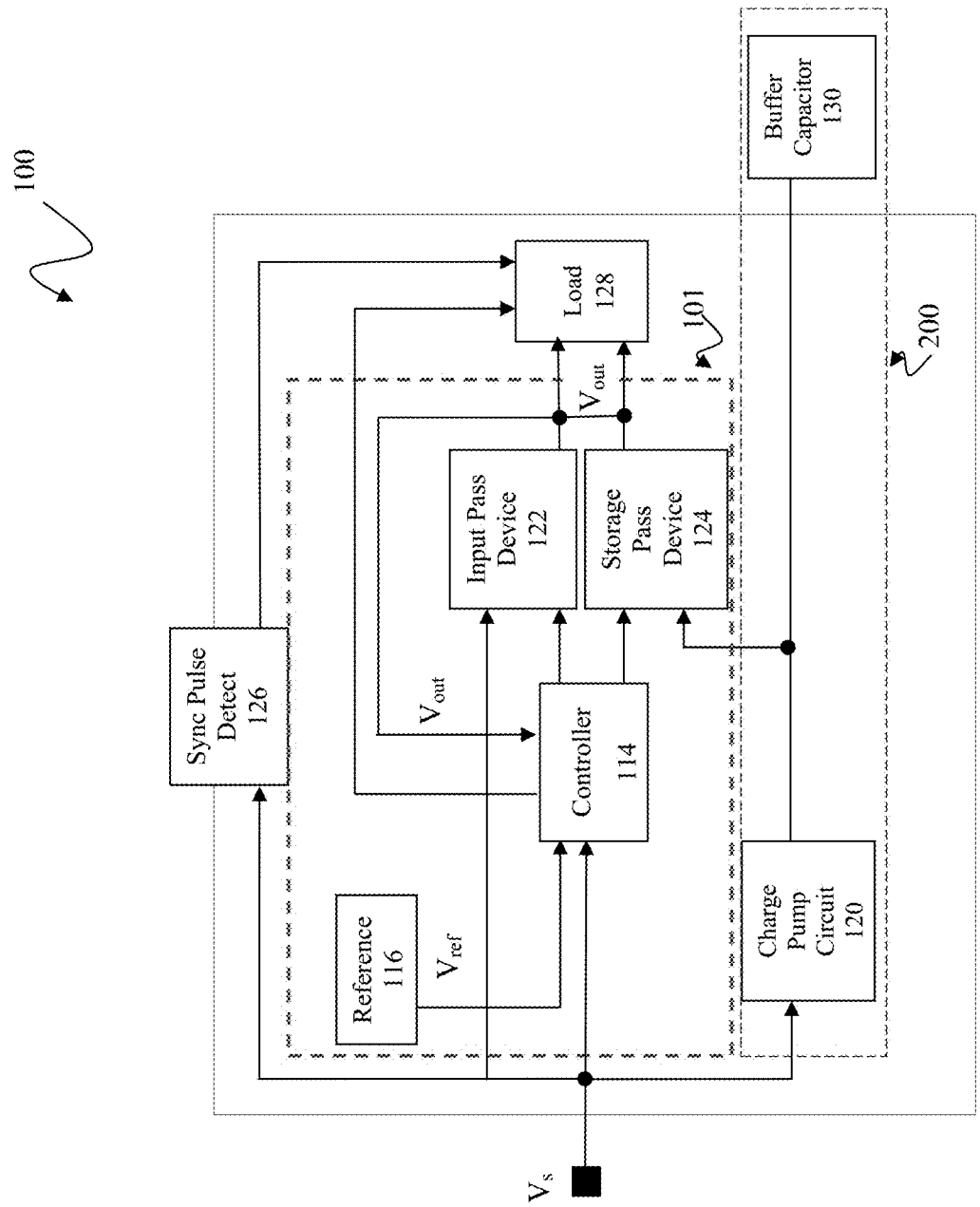
FIG. 1 is a schematic diagram of a sensor integrated circuit, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to circuits, systems and methods for providing interruption protection for sensors and other devices. One embodiment comprises an interruption protection circuit configured to maintain sufficient voltage for output signals of sensors or other devices during micro-breaks or other interruptions.

In embodiments, a sensor circuit comprises an interrupt protection circuit. In one embodiment, the interrupt protection circuit can comprise at least one buffer capacitor and at least one charge pump. The charge pump can be coupled to the buffer capacitor to charge the capacitor, such that the charge pump increases the amount of potential available to the sensor circuit, via the capacitor, by acting as a voltage multiplier. In embodiments, the charge pump is coupled to a supply source, such as a current source or a voltage source. In one embodiment, the supply source can relate to a synchronization pulse sent, received or otherwise used by the sensor circuit. The charge pump can comprise at least one pump stage, where the pump stage can comprise at least one switch and at least one capacitor and utilizes at least one clock signal.

In operation, for example, when the charge pump is enabled, the clock signal transitions to a logic high state and a first switch is activated. Activation of the first switch couples the capacitor to the charge pump such that the capacitor can be charged to the input voltage. The clock signal then transitions to a logic low state after the capacitor is charged to the input voltage, which deactivates the first switch and activates a second switch. Activation of the second switch provides additional charge to the capacitor, for example, enabling the bottom plate of the capacitor to be charged to the input voltage as well, thereby increasing the amount of voltage available via the capacitor to a level higher than the input voltage of the charge pump. In another embodiment, the output voltage of the charge pump is supplied to the buffer capacitor, thereby providing a voltage higher than the supply voltage across the buffer capacitor and increasing the available potential. The desired output voltage of the charge pump can vary based on the number of pump stages utilized and the size of the buffer capacitor. An increase in potential of the buffer capacitor allows an additional supply voltage to be set, such that the voltage of the capacitor is higher than the operating voltage. In embodiments, the energy stored in the buffer capacitor can be used to provide the interrupt protection circuit with a supply signal or a supplementary supply signal. Charging the buffer capacitor to a voltage higher than the operating voltage and above the critical threshold provides the capacitor with a sufficient amount of stored energy to maintain a high supply voltage during micro-breaks and other interruptions.

In another embodiment, a sensor circuit further comprises a processing unit, a pulse detection element, and a load. In embodiments, an output signal of the sensor circuit is supplied to the load, where the load can be arranged internal or external to the sensor circuit. Moreover, the pulse detection element is configured to detect the presence of a pulse at the input, such as a synchronization pulse and provides this information to the load, for example, to indicate that the load should synchronize with other external circuitries to transmit data to a control unit.

In embodiments, the load supplied from the externally delivered supply voltage or from the buffer capacitor during the occurrence of a micro-break or other interruption is the sensor itself and all of its associated processing circuitry such as analog to digital converters, filters, clock and reset generators, micro-controllers and protocol generators, etc.

In embodiments, the processing unit comprises at least one controller, at least one reference unit and at least one pass device circuit which is controlled by the controller. The reference unit is configured to provide a reference signal and information about an input signal. The controller is configured to receive an input signal, the reference signal and an output signal. As a result, the controller compares the input signal and the output signal with the reference signal, where the reference signal is used to provide the controller with a threshold range for the input signal and output signal. For example, by evaluating the input signal, the controller can determine if the value of the input signal is high enough to maintain a sufficient voltage of the output signal. Based on the values of the input signal, the controller manages the operation of a first pass device circuit and a second pass device circuit which is connected to the output of the controller.

In embodiments, the first pass device circuit is configured to receive the input signal and is activated by the controller when the input signal is above the reference signal. The second pass device circuit is configured to receive the supply signal or a supplementary supply signal, and is activated by the controller when the input signal is slightly above or below the reference signal. Once the first pass device circuit is activated, the controller verifies the output signal to ensure that the input signal is sufficient to maintain the fixed voltage of the output signal. Otherwise, if the input signal is too low to maintain the fixed voltage of the output, such as when it is slightly above the reference signal, the controller enables the second pass device circuit to provide a supplementary supply signal via the interrupt protection circuit. In this case, both pass device circuits are enabled and the controller regulates the amount of the supplementary supply signal that is added to the input signal to maintain the fixed output voltage.

Additionally, if the level of the input voltage is lower than the threshold, for example due to a micro-break or other interruptions, the controller enables the second pass device circuit to provide a supply signal to maintain the fixed output voltage. Without such circuitry, an interruption (i.e. micro-break) could lead to a reset of the sensor circuitry and cause a restart after the micro break disappears which results in an unavailability of the sensor function unless the initialization is finished, and embodiments disclosed herein provide therefore an additional supply source to maintain a fixed output voltage in the event of such an interruption.

Referring to FIG. 1, a schematic diagram of a sensor circuit 100 that utilizes interrupt protection in accordance with an embodiment is depicted. According to an embodiment, sensor circuit 100 comprises interrupt protection circuit 200, processing unit 101, reference unit 116, load 128, and pulse detection element 126. An interrupt protection circuit can comprise charge pump 120 and buffer capacitor 130.

In embodiments, input signal Vs is received from the bus supply of an external circuit such as an electronic control unit (not depicted in FIG. 1) and is the operating input voltage of the sensor circuit 100.

In embodiments, reference unit 116 provides a reference signal Vref to controller 114, whereby reference signal Vref includes predefined threshold values with regard to the input signal Vs. These threshold values can vary in embodiments, e.g., given available voltages, application, sensor type, or some other factor. Reference unit 116 can vary in embodiments and can be configured, for example, as a bandgap voltage reference or a Zener voltage reference. In embodiments, the energy stored in buffer capacitor 130 can be used as a supply signal or supplementary supply signal when the value of input signal Vs falls below a preset or critical threshold as defined by reference signal Vref. As such, use of a supplementary supply signal allows output signal Vout to maintain a fixed output voltage to be supplied to the circuitry of load 128. In operation, for example, load 128 can be configured to generate an output signal to a control unit, whereby the output signal can include sensor measurement data, sensor status or initialization data. The transmission of data from load 128 to the control unit can result in an increase in the current consumed by load 128. To compensate for the increase in current, however, controller 114 will adjust the control settings of pass devices 122 and 124. In embodiments, controller 114 controls which pass device circuit 122 or 124 is enabled based on a comparison of the input signal Vs and reference signal Vref. When the level of input signal Vs is higher in amount than reference signal Vref, controller 114 enables input pass device 122, which allows output signal Vout to be maintained by input signal Vs. In another embodiment, controller 114 enables storage pass device 124 when input signal Vs is below reference signal Vref, which allows the output signal Vout to be maintained by the supplementary supply signal of buffer capacitor 130. The current distribution between the external supply Vs and the buffer capacitor performed by input controlling pass device 122 and storage pass device 124 can be carried out by a variety of circuit and controller components. For example, input pass device 122 and storage pass device 124 can comprise bipolar transistors whose based terminals are connected to the output of controller 114, thereby selectively drawing current from either input signal Vs or the supplementary supply signal of buffer capacitor 130.

In another embodiment, controller 114 compares input signal Vs and output signal Vout with reference signal Vref to control the current flow from pass device elements 122 and 124. Controller 114 manages input pass device 122 and storage pass device 124 by regulating the portion of input signal Vs and the portion of the supplementary supply that contributes to output signal Vout. For example, conductance through the pass devices can be performed either from the operating voltage (input signal Vs) to the supplementary supply signal, or from the supplementary supply signal into the input signal Vs, which allows part of output signal Vout to be delivered from the supplementary supply signal and part to be delivered from the input signal. The percentage of output signal Vout that is maintained by input signal Vs, the supply signal of buffer capacitor 130, or a combination of input signal Vs and the supplementary supply signal of buffer capacitor 130, is determined by controller 114.

In one embodiment, a pulse detection element 126 can be implemented in sensor circuit 100 to detect pulses, such as synchronization pulses or other short increases in a supply signal associated with communications or other circuit events, in the input signal Vs in order to provide signal information to load 128. The signal information provided by pulse detection element 126 can be used, for example, for synchronization of the data transmission behavior of load 128 to be supplied with further circuitries.

In another embodiment, controller 114 can deliver an additional information signal to load 128 which can be used to alert load 128 to reduce its current consumption when input signal Vs falls below the critical threshold. Subsequent to receiving this signal information, load 128 can turn off excess current consumers. For example, a current consumer could be a current modulator in a pressure or other sensor that provides data transmission to an electronic control unit, and thereby has a higher current consumption than the sensor itself.

Figure 2:
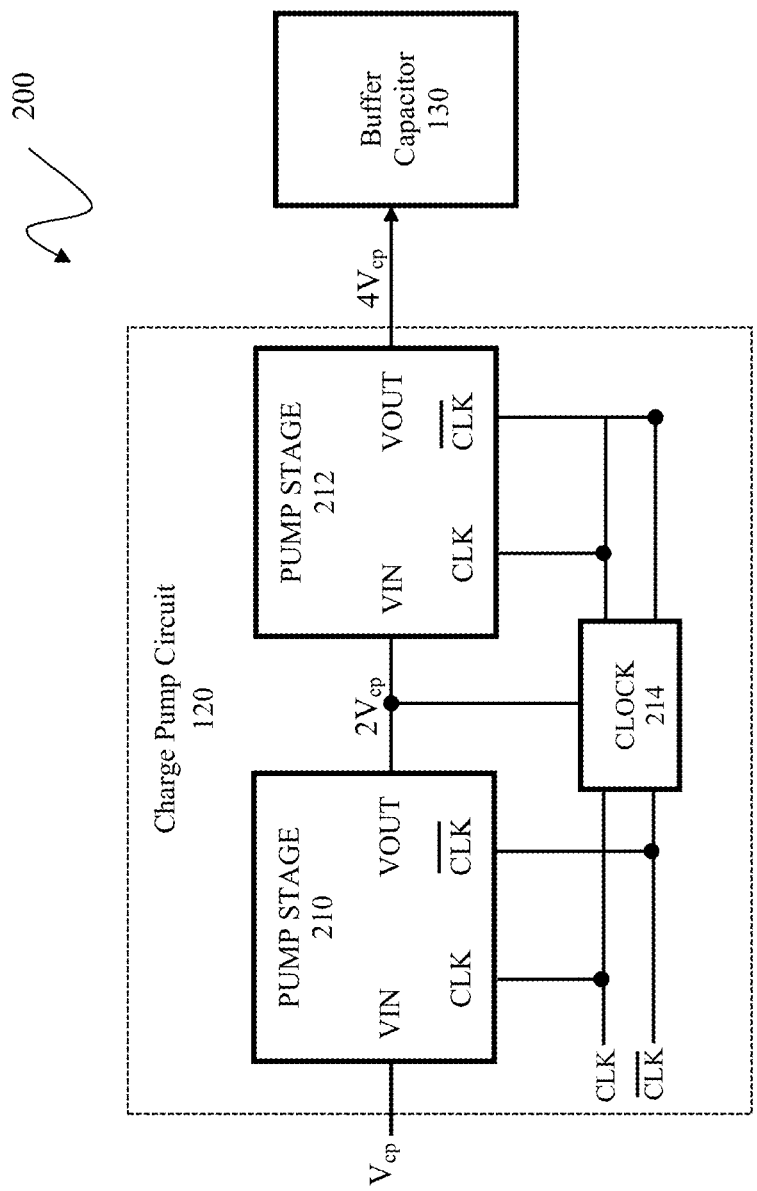
FIG. 2 is a schematic diagram of a charge pump circuit and storage capacitor, according to an embodiment.

Referring to FIG. 2, a block diagram is depicted of an interrupt protection circuit 200 in accordance with an embodiment. Interrupt protection circuit 200 comprises charge pump circuit 120 and buffer capacitor 130 in embodiments. Charge pump circuit 120 comprises pump stages 210 and 212 as depicted but can comprise more or fewer pump stages in other embodiments. The particular layout and design of charge pump circuit 120 is merely exemplary and can vary in embodiments. For example, charge pump circuit 120 can comprise one or more pump stages which are electrically coupled by connecting the output of one stage to the input of the next stage based on the desired output. Each pump stage can comprise a plurality of switching devices and capacitors to create an increased output voltage at each pump stage, where each switching device is alternately enabled by clock signal CLK and CLK bar. In operation, for example, when clock signal CLK is low, the first switch is activated and current flows to a first capacitor within the initial pump stage, thereby providing an increased potential and allowing the capacitor to be charged to the input voltage. The clock signal CLK then transitions to a high state and the first switch becomes deactivated. In this state, the second switch activates and current flows from the output of the first capacitor to a second capacitor within the initial pump stage, thereby allowing the second capacitor to be charged to a higher voltage than the input voltage. On the next cycle, clock signal CLK transitions to low and CLK bar goes high, the second switch deactivates and a third switch with a second pump stage activates, thereby increasing the voltage of a third capacitor to a higher voltage than the first two previous capacitors. Depending on the desired output, several pump stages can be implemented to generate a high output voltage of the charge pump circuit 120. In embodiments, the output terminal of the charge pump circuit 120 is connected to the input terminal of the buffer capacitor 130, therefore when the charge pump circuit is enabled the output voltage of the charge pump circuit 120 is supplied to the top plate of the buffer capacitor 130.

Referring to FIGS. 3A and 3B, timing diagrams of a charge pump mode of operation are depicted in accordance with an embodiment. Curve 300 represents the input voltage of the sensor circuit 100 based on the synchronization period of the input signal Vs. Curve 301 represents the input current of the sensor circuit 100 based on the data transmission period of the input signal Vs. Curve 302 represents charge pump mode 314 based on the synchronization period and data transmission period of input signal Vs. In embodiments, charge pump circuit 120 is enabled when the input signal Vs enters transmission mode 312, thereby increasing the current consumption of the sensor. In this state, the input signal is a pulsed current modulated signal where upon the rising edge of the signal, charge pump circuit 120 transitions to an active state and remains in an active state for the entire data transmission period. Therefore, although charge pump circuit 120 typically produces high power consumption, in such a configuration, the total power consumed by sensor circuit 100 is minimized. The current consumption remains completely unchanged during transmission mode 312 because charge pump circuit 120 only consumes a portion of the modulation current, which is already higher to accommodate data transmission. In this example, charge pump circuit 120 can operate independent of synchronization mode 310 and remains entirely inactive while the input sensor is not in transmission mode 312, further reducing the amount of power consumed.

Referring to FIG. 3B, curves 303 and 304 correspond to input signal curves 300 and 301 as depicted in FIG. 3A. Curve 305 represents charge pump mode 320 based on the synchronization period of input signal. In another embodiment, charge pump circuit 120 is enabled when the input signal enters synchronization mode 316, thereby minimizing the power consumed by the sensor circuit 100. Here, the input signal periodically generates a logic high voltage level at the input signal, thereby decreasing the number of pump stages that would be needed to generate the target output voltage of the charge pump circuit 120. Upon the rising edge of the signal, the charge pump circuit 120 activates and remains active for one synchronization period. In this example, charging mode 320 is active only during synchronization mode 316, and is deactivated while the input signal is in transmission mode 318.

In another embodiment, the input signal is supplied using a controlled voltage source (not depicted in FIG. 3) to manipulate the magnitude of the input voltage where the input voltage would behave as a stable voltage source. In this example, the number of pump stages required to achieve a desired output voltage of charge pump circuit 120 would increase, in addition to the power consumption of charge pump circuit 120.

Embodiments thereby provide interruption protection circuits, systems and methods which can be used with a variety of devices and in a variety of applications. Several applications can related to automotive sensing, such as with pressure and other sensors. For example, airbag sensor systems often use pressure sensors and are considered safety-critical applications in which minor power or other disruptions can pose significant problems. Incorporating embodiments of the interruption protection circuitry discussed herein in airbag sensing systems thus can provide operational protection with respect to micro-breaks and other interruptions can occur in an automobile. Other applications can include other sensors and devices in automotive applications, as well as in aerospace, medical, machining, and virtually any other situation its which a short power interruption can be a significant or troublesome drawback.

While various embodiments discussed herein refer to sensors or particular types or applications of sensors, these embodiments are in no way limiting with respect to the claims and are used herein as examples. Additionally, which some examples discuss particular signals, including particular signals which may be logically high or logically low, these again are mere examples, and in other embodiments other signals may be used, or the logic high and low triggers may be reversed, or other signal communication and processing techniques may be used, without limitation with respect to the claims or other embodiments discussed or depicted herein.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An interruption protection system for a supplied load, comprising:
   a power supply configured to provide power for the supplied load;
   a capacitor configured to provide buffer energy;
   a charge pump electrically coupled to the capacitor to charge the capacitor to a buffer voltage;
   a reference unit configured to provide a reference signal;
   a controller coupled to the power supply and to the reference unit and configured to receive the reference signal and to selectively control one or more supply paths from the power supply and from the capacitor to power the supplied load based on a comparison of the reference signal and a voltage level of the power supply; and
   at least one storage pass device coupled to the controller and to the capacitor, wherein the at least one storage pass device is coupled in the supply path between the capacitor and the supplied load, and wherein the controller is configured to control the at least one storage pass device to selectively control a current flow from the capacitor to the supplied load.

2. The system of claim 1, wherein the buffer voltage is greater than a power supply voltage under normal operation conditions.

3. The system of claim 1, wherein the charge pump comprises at least one pump stage.

4. The system of claim 3, wherein the at least one pump stage comprises at least one switch.

5. The system of claim 1, wherein the controller is configured to enable the at least one storage pass device to provide the buffer energy to the supplied load when the comparison indicates the level of power of the power supply is less than a threshold level of the reference signal.

6. The system of claim 5, wherein the buffer energy supplements the energy provided by the power supply.

7. The system of claim 5, wherein the buffer energy replaces energy provided by the power supply.

8. The system of claim 1, wherein the one or more supply paths comprises two distinct supply paths, further comprising at least one input pass device coupled to the controller, wherein the at least one input pass device is coupled in the supply path between the power supply and the supplied load, and wherein the controller is configured to selectively control the at least one input pass device to provide power from the power supply to the supplied load.

9. An interruption protection system for a supplied load, comprising:
   a power supply configured to provide power for the supplied load;
   a capacitor configured to provide buffer energy;
   a charge pump electrically coupled to the capacitor to charge the capacitor to a buffer voltage;
   a reference unit configured to provide a reference signal;
   a controller coupled to the power supply and to the reference unit and configured to receive the reference signal and to selectively control a supply path from the power supply and from the capacitor to power the supplied load based on a comparison of the reference signal and a voltage level of the power supply,
   wherein the charge pump is configured to coordinate charging of the capacitor with an event of the supplied load, wherein the event is one of a data signal transmission or a synchronization signal transmission.

10. A method of providing buffer energy to a supplied load, comprising:
   receiving a power supply signal characterizing an event of the supplied load;

enabling a charge pump to charge at least one buffer capacitor and coordinating the enabling of the charge pump with an event of the supplied load;

evaluating the power supply signal; and selectively utilizing the at least one buffer capacitor to provide energy to the circuit supplied load based on the evaluating;

wherein the coordinating further comprises enabling the charge pump to charge the at least one buffer capacitor during a data signal transmission by the supplied load or during a synchronization signal transmission by an external supply.

11. The method of claim 10, wherein the enabling further comprising selectively switching the charge pump to enable or disable the charging of the at least one buffer capacitor.

12. The method of claim 10, wherein the evaluating further comprises comparing the power supply signal with a reference signal, and selectively utilizing further comprises utilizing the at least one buffer capacitor to provide energy to the supplied load if the power supply signal is less than the reference signal.

13. The method of claim 10, wherein the selectively utilizing further comprising activating a pass device to enable the buffer capacitor to provide energy to the supplied load.

14. The method of claim 10, wherein the selectively utilizing further comprises providing energy to the load by the at least one buffer capacitor to supplement a energy provided by a power supply.

15. The method of claim 10, wherein the selectively utilizing further comprises providing power to the supplied load by the at least one buffer capacitor to replace a power provided by a power supply.

* * * * *